Nov. 28, 1944.  J. C. McCUNE ET AL  2,363,604
POWER DRIVE MOUNTING APPARATUS
Original Filed Sept. 27, 1941

INVENTORS
Joseph C. McCune
George K. Newell
BY
ATTORNEY.

Patented Nov. 28, 1944

2,363,604

UNITED STATES PATENT OFFICE 2,363,604

POWER DRIVE MOUNTING APPARATUS

Joseph C. McCune, Edgewood, and George K. Newell, near Pitcairn, Pa., assignors to The Westinghouse Air Brake Company, Wilmerding, Pa., a corporation of Pennsylvania Original application September 27, 1941, Serial No. 412,658. Divided and this application November 21, 1942, Serial No. 466,430

6 Claims. (Cl. 105—118)

This invention relates to power drive mounting apparatus and has particular relation to apparatus for mounting a driven shaft in associated relation with a driving shaft. The present application is a division of our prior copending application, Serial No. 412,658, filed September 27, 1941, and later abandoned.

It is an object of our present invention to provide a novel arrangement and apparatus whereby to support a driven shaft solely from a driving shaft associated therewith without external support for the driven shaft.

More particularly, it is an object of our invention to provide an arrangement and apparatus for mounting a device, responsive to the rotative condition of the wheel and axle assembly of a railway car, in associated relation therewith at a point between the wheels where, due to the presence of other elements as well as the construction of the car truck and low center sill of the car, the device cannot otherwise be mounted in a position between the wheels.

Figure 1:
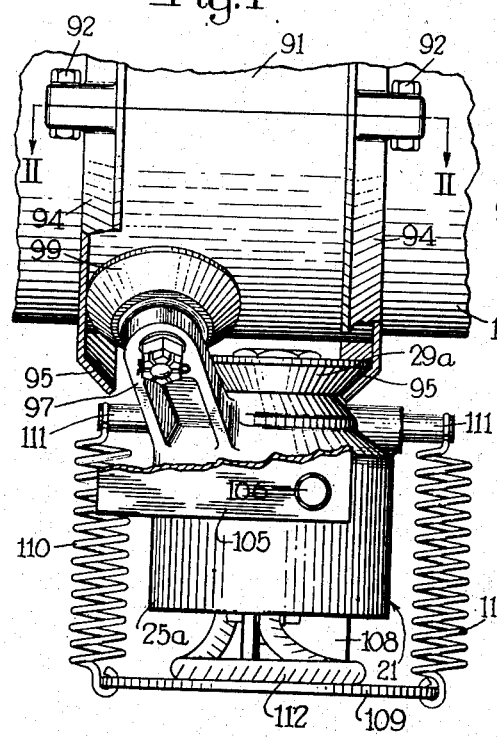
Figure 2:
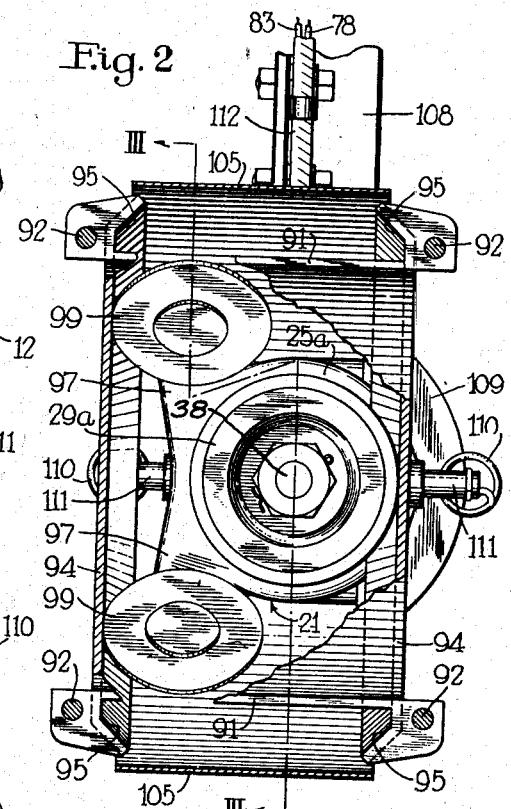
Figure 3:
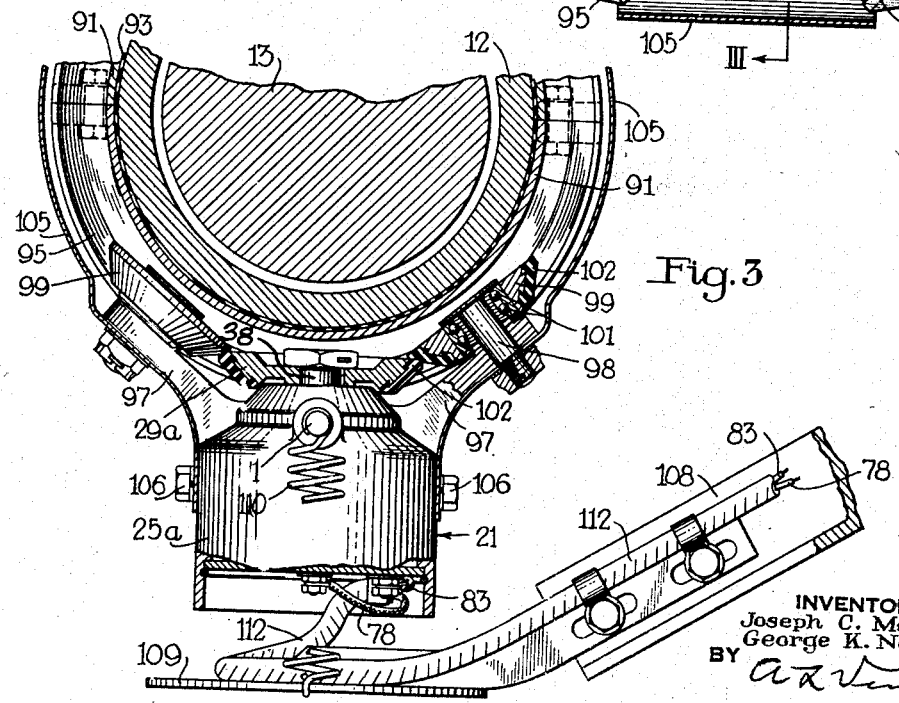

The above objects, and other objects of our invention which will be made apparent hereinafter, are obtained by apparatus subsequently to be described and shown in the accompanying drawing wherein Figure 1 is a fragmental elevational view illustrating one embodiment of our invention, Figure 2 is a horizontal sectional view, taken substantially on the line II—II of Figure 1, showing further details of construction, and Figure 3 is a sectional view, taken substantially on the line III—III of Figure 2, also showing further details of construction.

Description

While our invention may be employed in various situations and mechanisms, it has been illustrated in connection with the mounting of a rotary inertia device 21 in associated relation with the wheel and axle assembly of a railway car. The wheel and axle assembly shown in the drawing is of the composite type having an inner non-rotative axle 13 and an outer rotative concentrically disposed tubular axle 12. The car wheels (not shown) are fixed on opposite ends of the tubular axle and are journaled on the non-rotative axle 13 as by roller bearings not shown.

The rotary inertia device 21 is described in detail in our copending parent application, mentioned above, and is employed to detect the slipping of the vehicle wheels. The details of this device are not essential to the understanding of our present invention and thus no further description of the device is deemed necessary except to point out that it has a rotary shaft or spindle 38 which is intended to be driven in accordance with the rotational speed of the rotating axle 12. Insofar as our present invention is concerned, it is immaterial as to what use the device, corresponding to the device 21 is put or utilized. Thus it may be a speed governor or a generator instead of the rotary inertia device shown.

Referring now to the drawing, the device 21 is suspended directly from and vertically beneath the tubular axle 12 by means of a split sleeve member 91 having two semi-cylindrical portions secured together in fixed relation on the axle 12, as by a plurality of bolts 92. A split bushing 93 of cushioning material, such as rubber, may be provided as shown between the sleeve 91 and axle 12 for dampening or absorbing a certain amount of the road shock which would otherwise be transmitted to the device 21.

The sleeve 91 has two radially extending flanges 94 at opposite ends thereof, which flanges are formed with frusto-conical surfaces 95 thereon. The surfaces 95 are preferably at an angle of 45° to the axis of the tubular axle 12 and face in opposite directions toward each other. The casing 25a of the device 21 has two oppositely extending arms 97. Each arm 97 has a pin 98 fixed therein on which an idler wheel 99 is rotatively mounted, as by ball bearings 101.

A driving wheel 29a is secured to the outer end of the spindle 38 of the device. The idler wheels 99 and the driving wheel 29a have rim faces beveled at an angle corresponding to that of the frusto-conical surfaces on the flanges 94 and are provided with friction rims or tires 102 of suitable material, such as rubber.

The frusto-conical surfaces 95 on the flanges 94 act as trackways on which the wheels 29a and 99 of the device 21 have rolling contact as the axle 12 rotates. It will thus be apparent that the device 21 is suspended directly from the axle 12 and retained in a position beneath the axle due to its weight as the axle rotates, the driving wheel 29a being incidentally rotated according to the rotational speed of the axle 12.

A suitable circular shield 105, of sheet material, may be supported in concentric spaced relation around the axle 12 and sleeve 91 as by attaching the ends thereof to opposite sides of the casing 25a by screws 106. In railway service applications, the shield 105 serves to prevent entry of dirt particles, stones, or cinders into the space between the flanges 94, which might interfere with the rolling contact of the wheels 29a and 99 on the flanges and cause possible jamming of the wheels 29a and 99.

The weight of the device 21 is sufficient under normal circumstances to maintain it in a position beneath the tubular axle 12 as the axle rotates. If the wheels 29a and 99 become jammed, however, the device 21 may revolve with the axle and cause damage to itself and parts of the car wheel truck or mechanism carried by the wheel truck. A suitable bracket arm 108 may, therefore, be provided for preventing the revolution of the device 21 with the axle 12. In the case of a car wheel truck, the arm 108 may be attached at its upper end to a suitable part of the truck frame. At its lower end the arm 108 has a circular disc or supporting member 109 disposed directly beneath device 21. Two coil springs 110 located on diametrically opposite sides of the device 21, are connected at their opposite ends to suitable lugs 111 on the casing of the device 21 and to circular disc 109. The device 21 is thus permitted to have limited movement concentrically around the rotational axis of the wheel and axle assembly but it cannot revolve around the axle in a manner to cause damage to itself or parts of the wheel truck. Springs 110 assist in maintaining the frictional contact of the wheel 29a and 99 with the flanges 94, especially when the truck frame moves downwardly with increased loading.

The supporting disc 109 and bracket arm 108 also serve to support a conduit or cable 112 containing wires 72 and 83 leading to a switch mechanism in the device 21.

Having now described our invention, what we claim as new and desire to secure by Letters Patent, is:

1. Apparatus for supporting a device, having a driving wheel, so as to cause said driving wheel to be driven by rotation of a rotary shaft, said apparatus comprising means secured to said shaft and providing a pair of spaced flanges having frusto-conical surfaces facing in opposite directions, and a plurality of idler wheels rotatably carried by the casing of the device and adapted to cooperate with the driving wheel of the device in supporting the device in suspended relation from the said two spaced flanges beneath said rotary element, the driving wheel frictionally engaging the surface on one of said flanges.

2. Apparatus for supporting a device, having a driving wheel, in associated relation with a rotary shaft so as to cause the driving wheel to be driven by rotation of the shaft, said apparatus comprising means secured to said shaft and providing a pair of axially spaced frusto-conical surfaces concentrically surrounding the shaft, and a plurality of idler wheels having rims beveled in accordance with said frusto-conical surfaces and cooperating with the driving wheel in a manner to suspend the device vertically beneath the shaft from and between said frusto-conical surfaces with the rim of the driving wheel of the device frictionally engaging one of said frusto-conical surfaces.

3. Apparatus for mounting a device, having a driving wheel, in associated relation with a wheel and axle assembly of a railway car truck so that the driving wheel is driven by rotation of the wheel and axle assembly, said apparatus comprising means secured to the axle connecting the wheels of the wheel and axle assembly and providing a pair of axially spaced frusto-conical surfaces concentrically surrounding the axle, a plurality of idler wheels rotatably carried by the casing of the device and cooperating with the driving wheel in a manner to suspend the device from the axle by engagement with the frusto-conical surfaces, and means attached to the frame of the wheel truck and cooperating with said device in a manner to prevent revolution of the device about the axle.

4. Apparatus for mounting a device, having a driving wheel, in associated relation with a wheel and axle assembly of a railway car truck so that the driving wheel is driven by rotation of the wheel and axle assembly, said apparatus comprising means secured to the axle connecting the wheels of the wheel and axle assembly and providing a pair of axially spaced frusto-conical surfaces concentrically surrounding the axle, a plurality of idler wheels rotatably carried by the casing of the device and cooperating with the driving wheel in a manner to suspend the device from the axle by engagement with the frusto-conical surfaces, and resilient yielding means connecting the casing of the device to the wheel truck frame whereby to prevent revolution of the device about the axle and at the same time assist in maintaining the rim of the driving wheel in frictional contact with one of said frusto-conical surfaces.

5. Apparatus for mounting a device, having a driving wheel, in associated relation with a wheel and axle assembly of a railway car truck so that the driving wheel of the device is driven by rotation of the wheel and axle assembly, said apparatus comprising means detachably secured to the axle at a point between the wheels of the wheel and axle assembly and providing a pair of axially spaced annular trackways concentrically surrounding the axle, and a plurality of idler wheels rotatably carried by the casing of the said device and cooperating with the driving wheel of the device in a manner to suspend the device from the axle by rolling engagement with the inner surface of said annular trackways.

6. Apparatus for mounting a device, having a driving wheel, in associated relation with a wheel and axle assembly of a railway car truck so that the driving wheel of the device is driven by rotation of the wheel and axle assembly, said apparatus comprising means detachably secured to the axle at a point between the wheels of the wheel and axle assembly and providing a pair of axially spaced annular trackways concentrically surrounding the axle, a plurality of idler wheels rotatably carried by the casing of the said device and cooperating with the driving wheel of the device in a manner to suspend the device from the axle by rolling engagement with the inner surface of said annular trackways, and means for preventing rotation of said device around the axle.

JOSEPH C. McCUNE.
GEORGE K. NEWELL.